US012673653B2

(12) United States Patent
Kang

(10) Patent No.: US 12,673,653 B2
(45) Date of Patent: Jul. 7, 2026

(54) BRAKE APPARATUS AND METHOD OF CONTROLLING THE SAME

(71) Applicant: HL MANDO CORPORATION, Gyeonggi-do (KR)

(72) Inventor: Jeongnam Kang, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 59 days.

(21) Appl. No.: 18/945,485

(22) Filed: Nov. 12, 2024

(65) Prior Publication Data

US 2025/0360903 A1 Nov. 27, 2025

(30) Foreign Application Priority Data

May 22, 2024 (KR) ........................ 10-2024-0066164

(51) Int. Cl.
*B60T 13/74* (2006.01)
*B60T 7/04* (2006.01)
*B60T 8/173* (2006.01)

(52) U.S. Cl.
CPC ............ *B60T 13/745* (2013.01); *B60T 7/042* (2013.01); *B60T 8/173* (2013.01)

(58) Field of Classification Search
CPC ........ B60T 13/745; B60T 7/042; B60T 8/173; B60T 7/12; B60T 13/662; B60T 13/686; B60T 13/741; B60T 13/66; B60T 13/148; B60T 13/168
See application file for complete search history.

(56) References Cited

U.S. PATENT DOCUMENTS

2022/0073038 A1* 3/2022 Suzuki ..................... F16D 65/18
2025/0236275 A1* 7/2025 Hutchins ............... B60T 13/662

FOREIGN PATENT DOCUMENTS

| KR | 10-2021-0007510 | 1/2021 |
| KR | 10-2021-0120340 | 10/2021 |
| KR | 10-2021-0148633 | 12/2021 |

* cited by examiner

*Primary Examiner* — Xiao En Mo
(74) *Attorney, Agent, or Firm* — WOMBLE BOND DICKINSON (US) LLP

(57) ABSTRACT

Disclosed herein is a brake apparatus including a pressure source fluidly connected to a wheel brake of a vehicle through a flow passage connected to the wheel brake, a parking brake actuator mechanically connected to the wheel brake, a first processor configured to control the pressure source, and a second processor configured to control the parking brake actuator based on reception of a parking command signal. The second processor requests braking of the vehicle based on the reception of the parking command signal while the vehicle is traveling. The first processor controls the pressure source to increase a pressure of the wheel brake based on reception of the request from the second processor. The second processor controls the parking brake actuator to engage a parking brake based on a pressure of the flow passage connected to the wheel brake while the pressure source is operating.

20 Claims, 7 Drawing Sheets

BRAKE APPARATUS AND METHOD OF CONTROLLING THE SAME

CROSS-REFERENCE TO RELATED APPLICATION

This application claims the benefit of Korean Patent Application No. 10-2024-0066164, filed on May 22, 2024 in the Korean Intellectual Property Office, the disclosure of which is incorporated by reference herein in its entirety.

BACKGROUND

1. Field

Embodiments of the present disclosure relate to a brake apparatus including an electro-hydraulic brake and an electro-mechanical brake.

2. Description of the Related Art

In vehicles, brake apparatuses for braking are necessarily installed, and brake apparatuses for braking vehicles in various ways for the safety of drivers and passengers have been suggested.

In brake systems in the related art, when a driver steps on a brake pedal, the pressure of a pressure medium (brake fluid pressure or brake oil pressure) required for braking is provided to wheel brakes using a mechanically connected booster.

However, the market's demand to implement various braking functions in detailed response to a vehicle's operating environment is increasing. Accordingly, in recent years, a brake system including an electro-hydraulic brake that receives a driver's braking intention as an electrical signal when the driver steps on the brake pedal and supplies a pressure medium (e.g., brake fluid or brake oil) required for braking to the wheel brakes has become widespread. Furthermore, an electronic brake system additionally including an electro-mechanical brake that electro-mechanically operates preliminarily is being developed to protect against a failure of the electrically controlled electro-hydraulic brake (e.g., a failure of an electronic control unit (ECU), a failure of a motor, power cut-off, or the like).

SUMMARY

Therefore, it is an aspect of the present disclosure to provide a brake apparatus including an electro-hydraulic brake and an electro-mechanical brake, wherein the brake apparatus controls the electro-mechanical brake based on a parking command while a vehicle is stopped.

It is another aspect of the present disclosure to provide a brake apparatus including an electro-hydraulic brake and an electro-mechanical brake, wherein the brake apparatus controls the electro-hydraulic brake based on a parking command while a vehicle is traveling.

It is still another aspect of the present disclosure to provide a brake apparatus including an electro-hydraulic brake and an electro-mechanical brake, wherein the brake apparatus controls the electro-mechanical brake based on a parking command and a failure of the electro-hydraulic brake while a vehicle is traveling.

In accordance with one aspect of the present disclosure, a brake apparatus includes a pressure source fluidly connected to a wheel brake of a vehicle through a flow passage connected to the wheel brake, a parking brake actuator mechanically connected to the wheel brake, a first processor configured to control the pressure source, and a second processor configured to control the parking brake actuator based on reception of a parking command signal. The second processor requests braking of the vehicle based on the reception of the parking command signal while the vehicle is traveling. The first processor controls the pressure source to increase a pressure of the wheel brake based on reception of the request from the second processor. The second processor controls the parking brake actuator to engage a parking brake based on a pressure of the flow passage connected to the wheel brake while the pressure source is operating.

The second processor may request braking of the vehicle based on the reception of the parking command signal while a traveling speed of the vehicle is equal to or higher than a predetermined reference speed.

The second processor may control the parking brake actuator to engage the parking brake based on a difference between the pressure of the flow passage and a set target pressure being greater than an allowable error.

The first processor may identify an operating state of the pressure source based on the reception of the request from the second processor and transmit a first response signal to the second processor based on the pressure source being in a normal state. The second processor may determine the pressure of the flow passage connected to the wheel brake in response to receiving the first response signal.

The first processor may identify an operating state of the pressure source based on the reception of the request from the second processor and transmit a second response signal to the second processor based on the pressure source being in a failed state. The second processor may control the parking brake actuator to engage the parking brake in response to receiving the second response signal.

The first processor may control the pressure source to increase the pressure of the wheel brake while receiving the parking command signal while the vehicle is traveling and control the pressure source to decrease the pressure of the wheel brake based on cessation of receiving the parking command signal.

The second processor may control the parking brake actuator to engage the parking brake while receiving the parking command signal while the vehicle is traveling and control the parking brake actuator to release the parking brake based on cessation of receiving the parking command signal.

The second processor may be provided in a different housing from the first processor and connected through a communication network.

The second processor may be provided in a single housing with the first processor and provided on a different printed circuit board.

The brake apparatus may further include another pressure source controlled by the second processor and fluidly connected to the wheel brake through the flow passage. The second processor may operate the another pressure source to increase the pressure of the wheel brake based on the pressure of the flow passage connected to the wheel brake while the pressure source is operating and control the parking brake actuator to engage the parking brake based on the pressure of the flow passage connected to the wheel brake while the another pressure source is operating.

In accordance with another aspect of the present disclosure, a method of controlling a brake apparatus including a pressure source fluidly connected to a wheel brake of a vehicle through a flow passage connected to the wheel brake includes engaging or releasing a parking brake based on reception of a parking command signal, operating the pressure source to increase a pressure of the wheel brake based on the reception of the parking command signal while the vehicle is traveling, and engaging the parking brake based on a pressure of the flow passage connected to the wheel brake while the pressure source is operating.

The operating of the pressure source may include operating the pressure source to increase the pressure of the wheel brake based on the reception of the parking command signal while a traveling speed of the vehicle is equal to or higher than a predetermined reference speed.

The engaging of the parking brake may include engaging the parking brake based on a difference between the pressure of the flow passage and a set target pressure being outside an allowable error.

The method may further include identifying an operating state of the pressure source and determining the pressure of the flow passage connected to the wheel brake based on the pressure source being in a normal state.

The method may further include identifying an operating state of the pressure source and engaging the parking brake based on the pressure source being in a failed state.

The method may further include operating the pressure source to increase the pressure of the wheel brake while receiving the parking command signal while the vehicle is traveling and controlling the pressure source to decrease the pressure of the wheel brake based on cessation of receiving the parking command signal.

The method may further include engaging the parking brake while receiving the parking command signal while the vehicle is traveling and releasing the parking brake based on cessation of receiving the parking command signal.

In accordance with still another aspect of the present disclosure, a brake apparatus includes a first pressure source fluidly connected to a wheel brake of a vehicle through a flow passage connected to the wheel brake, a second pressure source fluidly connected to the wheel brake through the flow passage, a parking brake actuator mechanically connected to the wheel brake, a first processor configured to control the first pressure source, and a second processor configured to control the second pressure source and control the parking brake actuator based on reception of a parking command signal. The second processor requests braking of the vehicle based on the reception of the parking command signal while the vehicle is traveling. The first processor operates the first pressure source to increase a pressure of the wheel brake based on reception of the request from the second processor. The second processor controls the second pressure source to increase the pressure of the wheel brake based on a pressure of the flow passage connected to the wheel brake while the first pressure source is operating and controls the parking brake actuator to engage a parking brake based on the pressure of the flow passage connected to the wheel brake while the second pressure source is operating.

The second processor may request braking of the vehicle based on the reception of the parking command signal while a traveling speed of the vehicle is equal to or higher than a predetermined reference speed.

The second processor may control the second pressure source to increase the pressure of the wheel brake based on a difference between the pressure of the flow passage and a set target pressure being outside an allowable error while the first pressure source is operating and control the parking brake actuator to engage the parking brake based on a difference between the pressure of the flow passage and a set target pressure being outside an allowable error while the second pressure source is operating.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
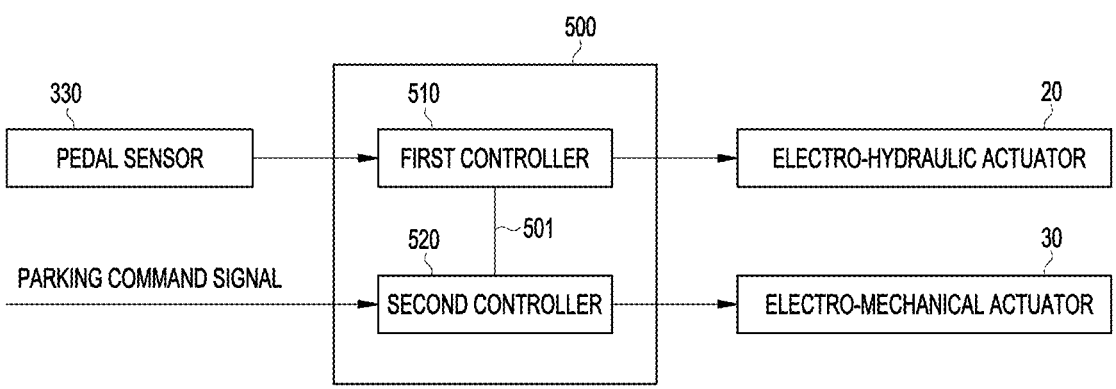
FIG. 1 schematically illustrates a configuration of a brake apparatus in accordance with one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

FIG. 1 schematically illustrates a configuration of a brake apparatus in accordance with one embodiment.

A vehicle may include a body that forms the exterior and accommodates a driver and/or luggage, a chassis that contains components of the vehicle other than the body, and wheels that rotate to allow the vehicle to move.

For example, the wheels may be provided with disks that are respectively coupled with the wheels and rotate together with the wheels. In addition, each of the wheels may be provided with a brake caliper capable of preventing rotation of the disk using friction. For example, the brake caliper may brake the rotation of each of the wheels and the disk using friction between a brake pad included in the brake caliper and the disk.

The brake caliper may be provided with electro-hydraulic brakes that accommodate a pressure medium such as, for example, brake fluid or brake oil and move the brake pad using the pressure of the pressure medium so that the brake pad presses the disk. The electro-hydraulic brake may operate, for example, as a service brake that brakes the vehicle in response to a driver's braking command via a brake pedal.

The electro-hydraulic brake may include an electro-hydraulic actuator 20. The electro-hydraulic actuator 20 may include wheel brakes 21, 22, 23, and 24 that generate a braking force for braking the vehicle by the pressure of the pressure medium.

In addition, the brake caliper may be provided with, for example, electro-mechanical brakes that move the brake pad so that the brake pad presses the disk using an electro-mechanical force without the pressure medium. The electro-mechanical brake may operate as a parking brake that brakes the vehicle in response to the driver's parking command, for example via a parking switch or hand brake.

The electro-mechanical brake may include an electro-mechanical actuator 30. The electro-mechanical actuator 30 may include devices for generating a physical force for braking the vehicle without the pressure medium. For example, the electro-mechanical actuator 30 may include a motor and/or power transmission device (e.g., gear, pulley/belt, spindle/nut, and the like).

As illustrated in FIG. 1, the brake apparatus 10 may include the electro-hydraulic actuator 20 and the electro-mechanical actuator 30 described above. In addition, the brake apparatus 10 may further include a pedal sensor 330 and/or a controller 500. The pedal sensor 330, the controller 500, the electro-hydraulic actuator 20, and the electro-mechanical actuator 30 illustrated in FIG. 1 do not correspond to necessary and sufficient components of the brake apparatus 10, and at least some of the components may be omitted or other components may be added.

The pedal sensor 330 may detect the movement of the brake pedal that moves according to a user's intention to brake, and may output an electrical signal (e.g., a voltage signal or current signal) depending on a moving distance and/or moving speed of the brake pedal (hereinafter referred to as a "pedal signal") to the controller 500.

The controller 500 may be separated or divided into a first controller 510 and a second controller 520.

The first controller 510 may be physically or circuit-wise separated from the second controller 520. For example, the first controller 510 may be provided in a different housing from the second controller 520. For another example, the first controller 510 may be provided in the same housing as the second controller 520, but may be provided on different printed circuit boards. For another example, the first controller 510 may be provided on the same printed circuit board as the second controller 520, but may be provided in a separate area.

The first controller 510 may receive a pedal signal from the pedal sensor 330, and may control the electro-hydraulic actuator 20 to brake the vehicle based on the pedal signal.

As described above, the second controller 520 may be physically or circuit-wise separated from the first controller 510. The second controller 520 may receive a parking command signal for parking or unparking the vehicle, and may control the electro-mechanical actuator 30 to park or unpark the vehicle based on the parking command signal.

The parking command signal may be provided to the second controller 520 from various signal sources. For example, the parking command signal may be provided to the second controller 520 from a parking switch, a transmission controller, or a central controller of the vehicle. The driver may operate the parking switch to park (for example, press the parking switch), and the parking switch may provide the parking command signal to the second controller 520 through the driver's operation. The driver may position a shift lever to "park" for parking, and the transmission controller may provide the parking command signal to the second controller 520 through the driver's operation. In addition, the driver may turn off an engine or get out of the vehicle after parking, and the central controller of the vehicle may provide the parking command signal to the second controller 520 by the turning-off of the engine or the getting-out of the driver.

The parking command signal may be a toggle signal based on a current state of the parking brake. For example, when the parking brake is released, the parking command signal may include a command to park the vehicle, and when the parking brake is engaged, the parking command signal may include a command to release the parking of the vehicle.

The second controller 520 may be connected to the first controller 510 through a data line 501, as illustrated in FIG. 1.

The data line 501 may be implemented in various forms. For example, when the second controller 520 is provided in a different housing from the first controller 510, the data line 501 may be implemented as a vehicle communication network. For another example, when the second controller 520 is provided in the same housing as the first controller 510 but on a different printed circuit board, the data line 501 may be implemented as a connector that electrically connects the printed circuit boards. For still another example, when the second controller 520 is provided on the same printed circuit board as the first controller 510 but in a different area on the printed circuit board, the data line 501 is implemented as a conductive line on the printed circuit board.

The second controller 520 may transmit data, signals and/or messages to the first controller 510 through the data line 501. The first controller 510 may also transmit data, signals, and/or messages to the second controller 520 through the data line 501.

For example, when the parking command signal is received while the vehicle is traveling, the second controller 520 may transmit a braking request to decelerate and stop the vehicle to the first controller 510 through the data line 501. Specifically, when the parking command signal is received while a traveling speed of the vehicle is equal to or higher than a predetermined reference speed, the second controller 520 may transmit the braking request to the first controller 510 through the data line 501. In order to efficiently decelerate and stop the vehicle and prevent sudden braking of the vehicle due to the engagement of the parking brake, the second controller 520 may request the first controller 510 to brake the vehicle through the pressure of the pressure medium. The first controller 510 may provide the electro-hydraulic actuator 20 with a pressure control signal for controlling the pressure of the pressure medium in the wheel brake based on reception of the braking request from the second controller 520.

For another example, when a failure of the electro-hydraulic actuator 20 is detected, the first controller 510 may transmit the braking request to decelerate and stop the vehicle to the second controller 520 through the data line 501. When it is not possible to brake the vehicle due to the failure of the electro-hydraulic actuator 20, the first controller 510 may request the second controller 520 to brake the vehicle using the electro-mechanical brake to prevent an accident. The second controller 520 may control the electro-mechanical actuator 30 to brake the vehicle based on reception of the braking request from the first controller 510.

In this way, the first controller 510 and the second controller 520 may collaborate with each other by exchanging data, signals, and/or messages with each other through the data line 501.

Furthermore, the first controller 510 and the second controller 520 may monitor each other's operations to make the brake apparatus 10 more robust against failure. The first controller 510 may monitor the operation of the second controller 520 and the electro-mechanical actuator 30, and the second controller 520 may also monitor the operation of the first controller 510 and the electro-hydraulic actuator 20. For example, the second controller 520 transmitting the braking request to the first controller 510 may monitor the hydraulic pressure by the electro-hydraulic actuator 20, and may control the electro-mechanical actuator 30 to brake the vehicle when it is detected that the hydraulic pressure by the electro-hydraulic actuator 20 has not increased.

In this way, by having the first controller 510 and the second controller 520 cooperate with each other and monitor each other's operations, the brake apparatus 10 may decelerate or stop the vehicle in response to not only the braking command via the brake pedal but also the parking command via the parking switch or the shift lever.

Figure 2:
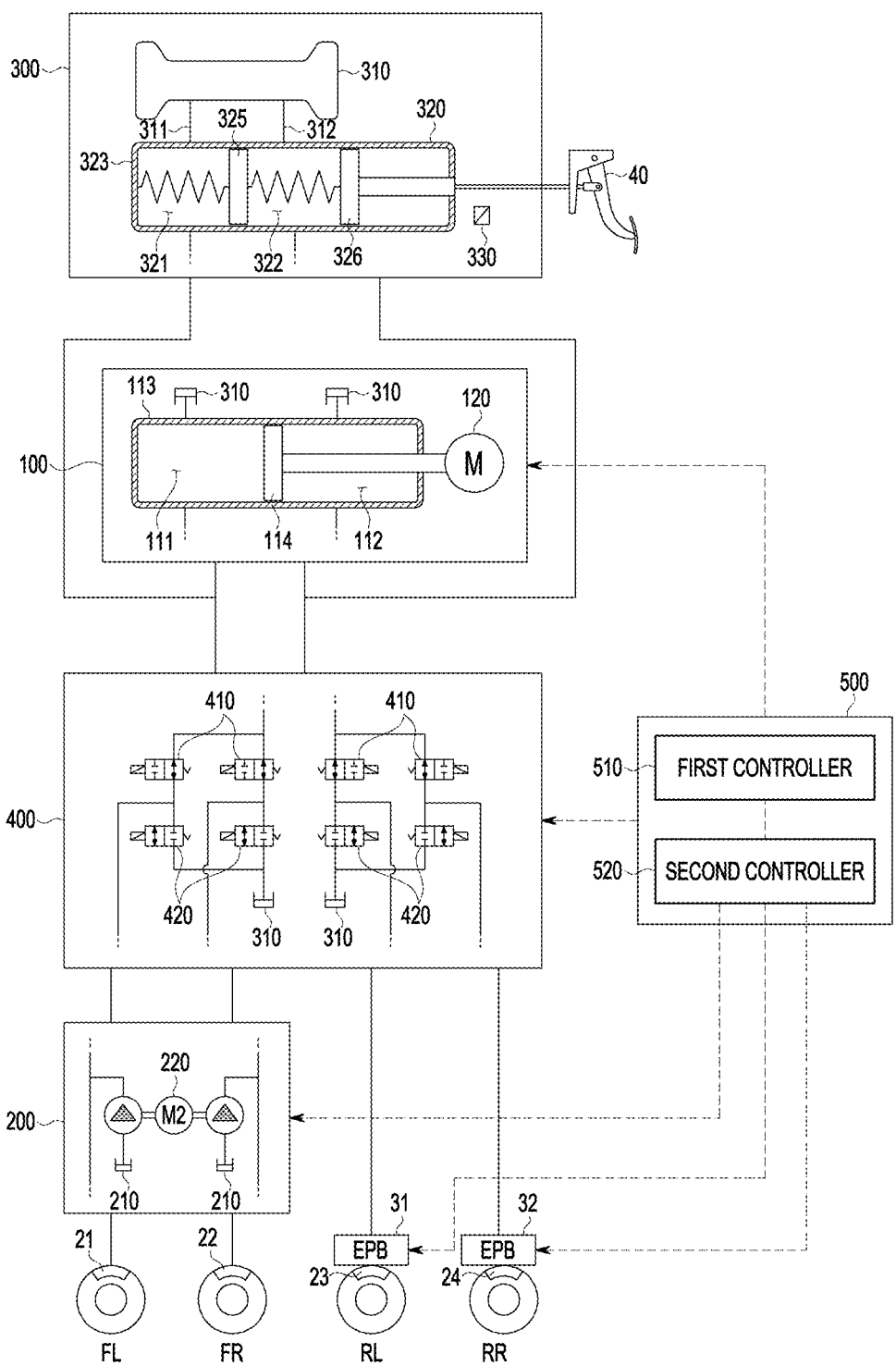
FIG. 2 illustrates one example of a brake apparatus in accordance with one embodiment.

FIG. 2 illustrates one example of a brake apparatus in accordance with one embodiment.

As described above, a vehicle may be provided with a plurality of wheels FL, FR, RL, and RR. The plurality of wheels FL, FR, RL, and RR may include a wheel FL provided on the front left side of the vehicle, a wheel FR provided on the front right side of the vehicle, a wheel RL provided on the rear left side of the vehicle, and a wheel RR provided on the rear right side of the vehicle. A plurality of wheel brakes 21, 22, 23, and 24 may be provided in the plurality of wheels FL, FR, RL, and RR, respectively. The number of wheels FL, FR, RL, and RR and the number of wheel brakes 21, 22, 23 and 24 are not limited to four. As the pressure inside the wheel brakes 21, 22, 23, and 24 increases, a braking force may be applied to the wheels FL, FR, RL, and RR, and as the pressure inside the wheel brakes 21, 22, 23, and 24 decreases, the braking force on the wheels FL, FR, RL, and RR may decrease.

A first parking brake actuator 31 and a second parking brake actuator 32 may be provided on the wheel RL provided on the rear left side of the vehicle and the wheel RR provided on the rear right side of the vehicle, respectively. Depending on the operation of the parking brake actuators 31 and 32, the parking brake may be engaged with the rear wheels RL and RR or the parking brake may be released.

The brake apparatus 10 may control the pressure inside the wheel brakes 21, 22, 23, and 24 or control the operations of the parking brake actuators 31 and 32.

As illustrated in FIG. 2, one example of the brake apparatus 10 may include a first pressure source 100, a second pressure source 200, an auxiliary pressure source 300, a pressure control unit 400, the parking brake actuators 31 and 32, and a controller 500. However, the first pressure source 100, the second pressure source 200, the auxiliary pressure source 300, the pressure control unit 400, the parking brake actuators 31 and 32, and the controller 500 do not correspond to necessary and sufficient components of the brake apparatus 10, and at least some of the components may be omitted or other components may be added.

The first pressure source 100 and the pressure control unit 400 may correspond to the electro-hydraulic actuator 20 described in FIG. 1. The first pressure source 100 and the pressure control unit 400 may be operated by a control signal and/or a driving current of the controller 500. For example, the first pressure source 100 may include a pump controlled or driven by the controller 500, and the pressure control unit 400 may include a valve controlled or driven by the controller 500.

The parking brake actuators 31 and 32 may correspond to the electro-mechanical actuator 30 described in FIG. 1. The parking brake actuators 31 and 32 may be operated by a control signal and/or a driving current of the controller 500. For example, the parking brake actuators 31 and 32 may include a motor and a power transmission device that are controlled or driven by the controller 500.

The auxiliary pressure source 300 may generate and discharge the pressure of a pressure medium by a driver's pressing force through a brake pedal 40.

The auxiliary pressure source 300 may include a reservoir 310 and a master cylinder 320.

The reservoir 310 may store pressure media, such as brake oil. The reservoir 310 may be connected to each component element to supply or receive a pressure medium. The reservoir 310 may be fluidly connected to the master cylinder 320 through reservoir flow passages 311 and 312.

The vehicle may include the brake pedal 40, and a pedal sensor 330 may detect movement or motion of the brake pedal 40. The pedal sensor 330 may provide a pedal signal indicating a displacement and/or moving speed of the brake pedal 40 to the controller 500.

The master cylinder 320 may compress and discharge the pressure medium contained therein by the pressing force applied to the brake pedal 40. The master cylinder 320 may include a first master chamber 321 and a second master chamber 322 formed within a master cylinder block 323. A first master piston 325 and a second master piston 326 may be provided in the first master chamber 321 and the second master chamber 322, respectively.

The first pressure source 100 may generate the pressure of a pressure medium for braking the wheels FL, FR, RL, and RR. The first pressure source 100 may generate the pressure of the pressure medium based on a control signal from the controller 500. The internal pressure of each of the wheel brakes 21, 22, 23, and 24 may depend on the pressure of the pressure medium provided from the first pressure source 100. Depending on internal pressures of the wheel brakes 21, 22, 23, and 24, the wheels FL, FR, RL, and RR may be braked, respectively.

The first pressure source 100 may include a pressure cylinder block 113 that accommodates the pressure medium, a pressure piston 114 that is provided to be reciprocally movable within the pressure cylinder block 113, and pressure chambers 111 and 112 into which the pressure cylinder block is partitioned by the pressure piston 114. The pressure cylinder block 113, the pressure piston 114, and pressure chambers 111 and 112 do not correspond to essential components of the first pressure source 100, and at least some of the components may be omitted.

The pressure of the pressure medium may be generated within the pressure chambers 111 and 112 by the reciprocating movement of the pressure piston 114. The pressure of the pressure chambers 111 and 112 may be transmitted to the wheel brakes 21, 22, 23, and 24 through the pressure control unit 400.

The pressure chambers 111 and 112 may include the first pressure chamber 111 positioned in front of the pressure piston 114 (left side of the pressure piston based on FIG. 2) and the second pressure chamber 112 positioned at the rear of the pressure piston 114 (right side of the pressure piston based on FIG. 2).

The first pressure chamber 111 is formed by the pressure cylinder block 113 and a front surface of the pressure piston 114, and a volume of the first pressure chamber 111 may change as the pressure piston 114 moves. In addition, the second pressure chamber 112 is formed by the pressure cylinder block 113 and a rear surface of the pressure piston 114, and a volume of the second pressure chamber 112 may change as the pressure piston 114 moves. The first pressure chamber 111 and the second pressure chamber 112 may each be fluidly connected to the pressure control unit 400 through a pressure flow passage.

The first pressure source 100 may include a first motor 120 that provides torque to move the pressure piston 114. In addition, the first pressure source 100 may further include a power conversion unit that converts the torque of the first motor 120 into translational movement of the pressure piston 114.

The pressure control unit 400 may be provided between the first pressure source 100 and the wheel brakes 21, 22, 23, and 24. The pressure control unit 400 may include, for example, a plurality of flow passages extending from the first pressure source 100 to the respective wheel brakes 21, 22, 23, and 24, and a plurality of valves capable of allowing or blocking the flow of the pressure medium in the plurality of flow passages.

The pressure control unit 400 may control the flow passages to guide the pressure of the pressure medium generated by the first pressure source 100 to the wheel brakes 21, 22, 23, and 24 or to recover the pressure medium of the wheel brakes 21, 22, 23, and 24 to the first pressure source 100.

For example, while the pressure piston 114 moves forward in response to an increase in the stroke of the brake pedal 40, the pressure control unit 400 may control the flow passages to guide the pressure of the pressure medium generated in the first pressure chamber 111 to the wheel brakes 21, 22, 23, and 24. In addition, while the pressure piston 114 moves backward after moving forward in response to the increase in the stroke of the brake pedal 40, the pressure control unit 400 may control the flow passages to guide the pressure of the pressure medium generated in the second pressure chamber 112 to the wheel brakes 21, 22, 23, and 24.

While the pressure piston 114 moves forward in response to a decrease in the stroke of the brake pedal 40, the pressure control unit 400 may control the flow passages to recover the pressure medium of the wheel brakes 21, 22, 23, and 24 to the second pressure chamber 112. In addition, while the pressure piston 114 moves backward after moving forward in response to the decrease in the stroke of the brake pedal 40, the pressure control unit 400 may control the flow passages to recover the pressure medium of the wheel brakes 21, 22, 23, and 24 to the first pressure chamber 111.

When a failure of the first pressure source 100 occurs, the pressure control unit 400 may control the flow passages to guide the pressure of a pressurized medium generated by the master cylinder 320 to the wheel brakes 23 and 24 of the rear wheels RL and RR or all the wheel brakes 21, 22, 23, and 24, or may control the flow passages to recover the pressurized medium of the wheel brakes 23 and 24 of the rear wheels RL and RR or all the wheel brakes 21, 22, 23, and 24 to the master brake 320. Hereinafter, a state in which the master brake 320 and the wheel brakes 21, 22, 23, and 24 are hydraulically connected due to a failure in the first pressure source 100 may be referred to as a fallback mode.

In addition, the pressure control unit 400 may modulate the pressure of the internal pressure medium of the wheel brakes 21, 22, 23, and 24. For example, the pressure control unit 400 may include inlet valves 410 that control the inflow of pressure medium into the wheel brakes 21, 22, 23, and 24 and outlet valves 420 that control the outflow of the pressure medium from the wheel brakes 21, 22, 23, and 24. The internal pressure of the wheel brakes 21, 22, 23, and 24 may be modulated by opening or closing the inlet valves 410 and/or the outlet valves 420. Thereby, functions such as an anti-lock braking system (ABS), an electronic stability control (ESC), and/or a traction control system (TCS) may be implemented.

The second pressure source 200 may have an outlet connected to a connection flow passage connecting the pressure control unit 400 and the wheel brakes 21 and 22 of the front wheels FL and FR, and may generate the pressure of the pressure medium for braking the front wheels FL and FR. In this way, the second pressure source 200 may supply the pressure of the pressure medium to the wheel brakes 21 and 22 of the front wheels FL and FR downstream of the pressure control unit 400.

The second pressure source 200 may be provided preliminarily or dually for the first pressure source 100. For example, when a failure of the first pressure source 100 is detected, the second pressure source 200 may replace the first pressure source 100 and generate the pressure of the pressure medium.

The second pressure source 200 may generate the pressure of the pressure medium based on the control signal of the controller 500, and may provide the pressure of the pressure medium to the wheel brakes 21 and 22 of the front wheels FL and FR.

The second pressure source 200 may include a pump 210 that rotates and pumps a pressure medium and a second motor 220 that provides torque for driving the pump 210.

The second pressure source 200 may further include a plurality of valves that open or close flow passages between the first pressure source 100 and the wheel brakes 21 and 22 of the front wheels FL and FR. The valves of the second pressure source 200 may open the flow passages between the first pressure source 100 and the wheel brakes 21 and 22 of the front wheels FL and FR during the normal state of the first pressure source 100. In addition, the valves of the second pressure source 200 may close the flow passages between the first pressure source 100 and the wheel brakes 21 and 22 of the front wheels FL and FR when a failure of the first pressure source 100 is detected.

The controller 500 may include one or two or more semiconductor devices and may be variously referred to, such as an electronic control unit (ECU). The controller 500 may include, for example, one or two or more processors and/or one or two or more memories.

The controller 500 may receive a pedal signal indicating the user's intention to brake from the pedal sensor 330. The pedal sensor 330 may detect the movement of the brake pedal 40 that moves according to the user's intention to brake, and may output an electrical signal (pedal signal) depending on a moving distance and/or moving speed of the brake pedal 40. The controller 500 may provide an electrical signal for supplying or recovering pressure medium to the wheel brakes 21, 22, 23, and 24 in response to the pedal signal to the first pressure source 100, the second pressure source 200, and/or the pressure control unit 400.

The controller 500 may be separated or divided into a first controller 510 and a second controller 520. The first controller 510 and the second controller 520 may be physically separated. For example, the first controller 510 and the second controller 520 may be provided in different housings. For another example, the first controller 510 and the second controller 520 may be provided in the same housing, but may be provided on different printed circuit boards. For another example, the first controller 510 and the second controller 520 may be provided on the same printed circuit board, but may be provided in different areas separated from each other.

The first controller 510 and the second controller 520 may separately control the first pressure source 100, the second pressure source 200, the pressure control unit 400, and/or the parking brake actuators 31 and 32. For example, the first controller 510 may control the first pressure source 100 and the pressure control unit 400, and the second controller 520 may control the second pressure source 200 and the parking brake actuators 31 and 32. However, the objects controlled by the first controller 510 and the second controller 520 are not limited to the aforementioned description.

The first controller 510 and the second controller 520 may receive a pressure signal, a pedal signal, and/or a wheel speed signal from the pressure sensor 430, the pedal sensor 330, and/or a wheel sensor 50, and may control the first pressure source 100, the second pressure source 200, the pressure control unit 400 and/or the parking brake actuators 31 and 32 based on the pressure signal, the pedal signal and/or the wheel speed signal.

The first controller 510 and the second controller 520 may monitor operating states of the first pressure source 100, the second pressure source 200, the pressure control unit 400, and/or the parking brake actuators 31 and 32. For example, the first controller 510 may monitor the operating state of the first pressure source 100. The first controller 510 may identify whether the first pressure source 100 is in a normal state or a failed state based on the pressure signal of the pressure sensor 430 while operating the first pressure source 100. The first controller 510 may determine that the first pressure source 100 is in the normal state when a difference between a measured pressure measured while operating the first pressure source 100 and a target pressure is within a predetermined allowable error. The first controller 510 may determine that the first pressure source 100 is in the failed state when a difference between a measured pressure measured while operating the first pressure source 100 and a target pressure is outside the predetermined allowable error. The second controller 520 may identify whether the second pressure source 200 is in a normal state or a failed state based on the pressure signal of the pressure sensor 430 while operating the second pressure source 200.

The first controller 510 and the second controller 520 may exchange data with each other. For example, the first controller 510 and the second controller 520 may exchange data through a vehicle communication network or exchange data through a data line directly connected to the first controller 510 and the second controller 520.

The second pressure source 200 and the parking brake actuators 31 and 32 may operate preliminarily or dually for the first pressure source 100. For example, when a failure of the first controller 510 or a failure of the first pressure source 100 is detected, the second controller 520 may control the second pressure source 200 and/or the parking brake actuators 31 and 32 to brake the vehicle based on the pedal signal received from the pedal sensor 330.

Figure 3:
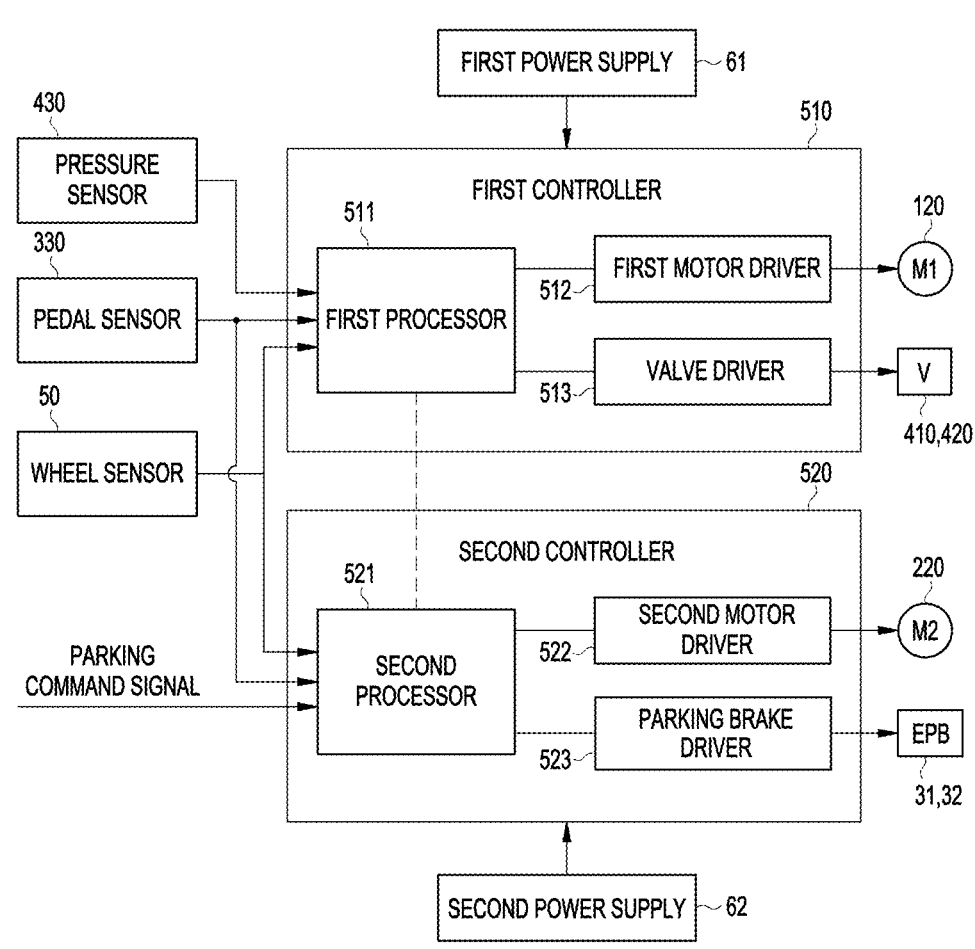
FIG. 3 illustrates one example of a controller included in the brake apparatus illustrated in FIG. 2.

FIG. 3 illustrates one example of the controller included in the brake apparatus illustrated in FIG. 2.

As illustrated in FIG. 3, the vehicle may be provided with the pressure sensor 430, the pedal sensor 330, the wheel sensor 50, the first motor 120, the valves 410 and 420, the second motor 220, the parking brake actuators 31 and 32 and/or the controller 500. The brake apparatus 10 in accordance with one embodiment may include the pressure sensor 430, the pedal sensor 330, the first motor 120, the valves 410 and 420, the second motor 220, and/or the controller 500, and the wheel sensor 50 and the parking brake actuators 31 and 32 may be provided separately from the brake apparatus 10 in accordance with one embodiment.

The wheel sensor 50 may be provided on each of the wheels FL, FR, RL, and RR of the vehicle, and may detect the rotation and/or rotation speed of the wheels FL, FR, RL, and RR due to traveling of the vehicle. The wheel sensor 50 may provide an electrical signal (e.g., a voltage signal or current signal) corresponding to the rotation speed of the wheels FL, FR, RL, and RR (hereinafter referred to as a "wheel speed signal") to the controller 500 of the brake apparatus 10.

The parking brake actuators 31 and 32 may be provided on at least some of the wheels FL, FR, RL, and RR, and may drive the wheels FL, FR, RL, and RR to rotate. For example, the parking brake actuators 31 and 32 may be provided on the rear wheels RL and RR to restrain the rotation of the rear wheels RL and RR. Each of the parking brake actuators 31 and 32 may include a motor, and the torque provided by the motor provided in each of the parking brake actuators 31 and 32 may be converted into a translational movement that moves the brake pad toward the disk by a spindle.

The pressure sensor 430, the pedal sensor 330, the first motor 120, the valves 410 and 420, the second motor 220, and/or the controller 500 do not correspond to necessary and sufficient components of the brake apparatus 10, and at least some of the components may be omitted or other components may be added.

The pressure sensor 430 may be provided on flow passages extending from the first pressure source 100 and/or the second pressure source 200 to the wheel brakes 21, 22, 23, and 24, and may measure the pressure of the pressure medium provided to the wheel brakes 21, 22, 23, and 24 by the first pressure source 100 and/or the second pressure source 200. The pressure sensor 430 may output an electrical signal (e.g., a voltage signal or current signal) (hereinafter referred to as a "pressure signal") corresponding to the measured pressure to the controller 500.

The pedal sensor 330 may detect the movement of the brake pedal that moves according to the user's intention to brake, and may output the electrical pedal signal depending on the moving distance and/or moving speed of the brake pedal to the controller 500.

The first motor 120 may be provided in the first pressure source 100, and may provide power (torque) for generating the pressure of the pressure medium in the pressure chambers 111 and 112 to the pressure piston 114. The pressure piston 114 may move in translation by the torque provided by the first motor 120.

The valves 410 and 420 may be provided in the pressure control unit 400, and may control the flow passages of the pressure medium extending from the first pressure source 100 to the wheel brakes 21, 22, 23, and 24. The valves 410 and 420 may include a plurality of solenoid valves provided on the flow passages of the pressure medium.

The second motor 220 may be provided in the second pressure source 200, and may provide power (torque) for generating the pressure of the pressure medium to the pump 210. The pump may pump the pressure medium by the torque provided by the second motor 220.

The controller 500 may include the first controller 510 and the second controller 520.

The first controller 510 may be provided in a separate housing that is different from the second controller 520. For example, the first controller 510, the first pressure source 100, and the pressure control unit 400 may be integrally provided within a single housing, or may be provided as a single product. In addition, the second controller 520 and the second pressure source 200 may be integrally provided within a single housing or provided as a single product.

In addition, the first controller 510 may receive power from a different power source than the second controller 520. For example, the first controller 510, the first pressure source 100, and the pressure control unit 400 may receive power from a first power supply 61 of the vehicle, and the second controller 520 and the second pressure source 200 may receive power from a second power supply 62 of the vehicle.

The first controller 510 may provide a driving voltage, a driving current, and/or a driving power for controlling the pressure of the pressure medium in the wheel brakes 21, 22, 23, and 24 in response to the pedal signal of the pedal sensor 330, the pressure signal of the pressure sensor 430, and/or the wheel speed signal of the wheel sensor 50 to the first motor 120 and/or the valves 410 and 420.

The first controller 510 may include a first motor driver 512, a valve driver 513, and a first processor 511. The first motor driver 512, the valve driver 513, and the first processor 511 do not correspond to essential components of the controller 500, and at least some of the components may be omitted.

The first motor driver 512 may receive a control signal from the first processor 511 and provide a driving current based on the control signal from the first processor 511 to the first motor 120 of the first pressure source 100. For example, in response to the control signal from the first processor 511, the first motor driver 512 may provide a driving current for moving the pressure piston 114 forward to the first motor 120, or may provide a driving current for moving the pressure piston 114 backward to the first motor 120. The first motor driver 512 may include, for example, an inverter circuit that controls the driving current of the first motor 120, a gate driver for driving an input terminal of the inverter circuit, and the like.

The valve driver 513 may receive a control signal from the first processor 511 and provide a driving current for driving the valves 410 and 420 of the pressure control unit 400 in response to the control signal from the first processor 511. For example, in response to the control signal from the first processor 511, the valve driver 513 may provide the driving current to each of the valves 410 and 420 so that a flow passage may be formed from the first pressure chamber 111 of the first pressure source 100 to the wheel brakes 21, 22, 23, and 24, or may provide the driving current to each of the valves 410 and 420 so that a flow passage may be formed from the second pressure chamber 112 of the first pressure source 100 to the wheel brakes 21, 22, 23, and 24.

The first processor 511 may process output signals of the pressure sensor 430, the pedal sensor 330, and the wheel sensor 50 and control the first pressure source 100 and/or the pressure control unit 400 based on the processing of the output signals.

The first processor 511 may control the first motor driver 512 and/or the valve driver 513 to drive the first motor 120 and/or the valves 410 and 420 based on the pedal signal of the pedal sensor 330 and the pressure signal of the pressure sensor 430. For example, the first processor 511 may control the first motor driver 512 and/or the valve driver 513 so that the measured pressure based on the pressure signal from the pressure sensor 430 follows a target pressure based on the pedal signal.

The first processor 511 may control the first motor driver 512 and/or the valve driver 513 to drive the first motor 120 and/or the valves 410 and 420 based on the wheel speed signal of the wheel sensor 50. For example, the first processor 511 may determine wheel slip or wheel spin based on the wheel speed signal of the wheel sensor 50 and provide a control signal for controlling the first motor 120 and/or the valves 410 and 420 to the first motor driver 512 and/or the valve driver 513 based on the wheel slip or wheel spin. Thereby, the first pressure source 100 may achieve ABS or TCS.

The first processor 511 may include one semiconductor device or a plurality of semiconductors. The first processor 511 may include one core or a plurality of cores in the semiconductor device. In addition, the first processor 511 may be variously referred to, such as a micro controller unit (MCU).

In addition, the first processor 511 may include a memory that memorizes/stores programs and data for braking the vehicle based on the user's intention to brake and/or the rotation speed of the wheels FL, FR, RL, and RR. The memory may provide programs and data to the first processor 511 and store temporary data generated during an arithmetic operation of the first processor 511. For example, the memory may include, for example, a volatile memory such as a static random access memory (S-RAM), a dynamic random access memory (D-RAM), or the like, or a non-volatile memory such as an erasable programmable read only memory (EPROM), a flash memory, or the like.

The first controller 510 may provide a driving voltage, a driving current and/or a driving power for controlling the pressure of the pressure medium in the wheel brakes 21 and 22 of the front wheels FL and FR or engaging/releasing the parking brake of the rear wheels RL and RR in response to the pedal signal of the pedal sensor 330 and/or the parking command signal to the second motor 220 and/or the parking brake actuators 31 and 32.

The second controller 520 may include a second motor driver 522, a parking brake driver 523, and a second processor 521. The second motor driver 522, the parking brake driver 523, and the second processor 521 do not correspond to essential components of the second controller 520, and at least some of the components may be omitted.

The second motor driver 522 may receive a control signal from the second processor 521 and provide a driving current based on the control signal from the second processor 521 to the second motor 220 of the second pressure source 200. For example, the second motor driver 522 may provide a driving current for causing the pump 210 to pump the pressure medium to the second motor 220 in response to the control signal from the second processor 521. The second motor driver 522 may include, for example, an H bridge circuit for controlling the driving current of the second motor 220 and a gate driver for driving an input terminal of the H bridge circuit.

The parking brake driver 523 may receive an engaging/releasing signal from the second processor 521 and provide a driving current for engaging the parking brake based on the engaging/releasing signal to the parking brake actuators 31 and 32. For example, the parking brake driver 523 may provide a driving current for restraining the rotation of the rear wheels RL and RR or releasing the restraint to the parking brake actuators 31 and 32 in response to the control signal. The parking brake driver 523 may include an H-bridge circuit that controls the driving current of the parking brake actuators 31 and 32, a gate driver for driving an input terminal of the H-bridge circuit, and the like.

The second processor 521 may process output signals of the pedal sensor 330 and the wheel sensor 50 and control the second pressure source 200 and the parking brake actuators 31 and 32 based on the processing of the output signals.

The second processor 521 may exchange data and/or signals with the first processor 511 through various paths. For example, the second processor 521 may exchange data and/or signals with the first processor 511 through a signal line connected to the first processor 511 or exchange data and/or signals with the first processor 511 through the vehicle communication network.

The second processor 521 may exchange various data and/or signals with the first processor 511.

For example, the first processor 511 may periodically transmit an electrical signal (e.g., a pulse signal) to the second processor 521 during the normal state. The second processor 521 may receive the periodic signal from the first processor 511, and may deactivate the second pressure source 200 while receiving the periodic signal from the first processor 511. For example, the second processor 521 may control the second motor driver 522 so as not to drive the second motor 220 while receiving the periodic signal. The second processor 521 may operate the second pressure source 200 based on the periodic signal from the first processor 511 not being received. When the periodic signal is not received from the first processor 511, it may be identified that the first processor 511 is not in the normal state (that is, the first processor is in the failed state).

For example, the first processor 511 may transmit a signal indicating the operating state of the first pressure source 100 to the second processor 521. The second processor 521 may deactivate the second pressure source 200 based on reception of a signal indicating the normal state of the first pressure source 100. The second processor 521 may operate the second pressure source 200 based on reception of a signal indicating a failure of the first pressure source 100.

The second processor 521 may control the second motor driver 522 and the parking brake driver 523 to drive the second motor 220 and/or the parking brake actuators 31 and 32 based on the pedal signal of the pedal sensor 330 during the failure of the first pressure source 100 and/or the first controller 510. For example, the second processor 521 may provide a control signal determined based on the pedal signal to the second motor driver 522 and/or the parking brake driver 523.

The second processor 521 may control the second motor driver 522 and the parking brake driver 523 to drive the second motor 220 and/or the parking brake actuators 31 and 32 based on the wheel speed signal of the wheel sensor 50 during the failure of the first pressure source 100 and/or the first controller 510.

The second processor 521 may receive a parking command signal for parking or unparking the vehicle. The parking command signal may be provided to the second processor 521 from a parking switch, a transmission controller, or a central controller of the vehicle. The parking command signal may be a toggle signal based on states of the parking brake actuators 31 and 32. For example, while releasing the parking brake, the parking command signal may indicate a command to engage the parking brake, and while engaging the parking brake, the parking command signal may indicate a command to release the parking brake. The second processor 521 may provide a control signal to the parking brake driver 523 to engage or release the parking brake based on the parking command signal.

The second processor 521 may include one semiconductor device or a plurality of semiconductors. The second processor 521 may include one core or a plurality of cores in the semiconductor device. In addition, the second processor 521 may be variously referred to, such as an MCU.

The second processor 521 may include a memory that memorizes/stores programs and data for braking the vehicle based on the user's intention to brake and/or the rotation speed of the wheels FL, FR, RL, and RR. The memory may provide programs and data to the second processor 521 and store temporary data generated during an arithmetic operation of the second processor 521. The memory may include, for example, a volatile memory such as an S-RAM, a D-RAM, or the like, and a non-volatile memory such as an EP-ROM, a flash memory, or the like.

As described above, the second processor 521 is physically separated from the first processor 511 by being provided in a different housing, but the second processor 521 may be electrically connected to the first processor 511 through a communication network or data line. Thereby, the second processor 521 may collaborate with the first processor 511.

The second processor 521 may request the first processor 511 to brake the vehicle using the first pressure source 100 based on the reception of the parking command signal while the vehicle is traveling.

For example, the second processor 521 may request the first processor 511 to brake the vehicle using the first pressure source 100 while the traveling speed of the vehicle based on the wheel speed signal of the wheel sensor 50 is equal to or higher than a predetermined reference speed and the parking command signal from the external device continues to be received. The second processor 521 may stop requesting the first processor 511 to brake the vehicle using the first pressure source 100 when the reception of the parking command signal is ceased while the traveling speed of the vehicle is equal to or higher than the predetermined reference speed. For example, when the driver presses the parking switch while the vehicle is traveling, the second processor 521 may request the first processor 511 to brake the vehicle using the first pressure source 100, and when the driver stops pressing the parking switch, the second processor 521 may stop requesting the first processor 511 to brake the vehicle using the first pressure source 100.

The first processor 511 may check whether the first pressure source 100 is valid in response to the braking request of the second processor 521.

When the first pressure source 100 is valid, a first response signal indicating that braking using the first pressure source 100 is possible may be transmitted to the second processor 521. In addition, the first processor 511 may output a control signal to the first motor driver 512 and/or the valve driver 513 to provide the pressure of the pressure medium to the wheel brakes 21, 22, 23, and 24. For example, the first processor 511 may output the control signal to the first motor driver 512 and/or the valve driver 513 so that the measured pressure based on the pressure signal from the pressure sensor 430 follows a predetermined target pressure or a target pressure based on the traveling speed of the vehicle. The first pressure source 100 may generate a pressure of the pressure medium corresponding to the target pressure. Thereby, the vehicle may be braked.

When the first pressure source 100 is not valid, a second response signal indicating that braking using the first pressure source 100 is not possible may be transmitted to the second processor 521. The second processor 521 may receive the second response signal of the first processor 511 and provide a control signal to the parking brake driver 523 to engage the parking brake of the rear wheels RL and RR based on the second response signal. In addition, the second processor 521 may output a control signal to the second motor driver 522 so that the second pressure source 200 provides the pressure of the pressure medium to the wheel brakes 21 and 22 of the front wheels FL and FR based on the second response signal.

As described above, when the parking command signal is received while the vehicle is stopped, the second processor 521 may provide the control signal to the parking brake driver 523 to engage or release the parking brake based on whether the parking brake is engaged. Unlike when the parking command signal is received while the vehicle is stopped, when the parking command signal is received while the vehicle is traveling, the second processor 521 may provide a control signal to the parking brake driver 523 to engage the parking brake while a valid parking command signal is received. When the reception of the valid parking command signal is ceased, the second processor 521 may provide a control signal to the parking brake driver 523 to release the parking brake.

When the second processor 521 receives the first response signal indicating that braking using the first pressure source 100 is possible, the second processor 521 may monitor an operating state of the first pressure source 100. Specifically, the second processor 521 may monitor the pressure of the pressure medium generated by the first pressure source 100.

For example, the first processor 511 may receive a pressure signal from the pressure sensor 430 and transmit the pressure signal to the second processor 521. The second processor 521 may monitor the operating state of the first pressure source 100 based on the pressure signal obtained by the first processor 511.

For another example, the second processor 521 may receive the pressure signal directly from the pressure sensor 430. The second pressure source 200 may be provided between the first pressure source 100 and the wheel brakes

21, 22, 23, and 24, and the pressure sensor 430 may be provided downstream of the first pressure source 100 or downstream of the second pressure source 200. The pressure sensor 430 may provide a pressure signal indicating the pressure of the pressure medium measured downstream of the first pressure source 100 or downstream of the second pressure source 200 to the second processor 521. The second processor 521 may monitor the operating state of the first pressure source 100 based on the pressure signal obtained by the pressure sensor 430.

The second processor 521 may identify whether a difference between a measured pressure based on the pressure signal obtained by the first processor 511 or the pressure sensor 430 and a target pressure is within a predetermined error range.

When the difference between the measured pressure based on the pressure signal and the target pressure is within the predetermined error range, it may be determined that the first pressure source 100 is in the normal state. On the other hand, when the difference between the measured pressure based on the pressure signal and the target pressure is outside the predetermined error range, a failure of the first pressure source 100 may be determined.

For this reason, when the difference between the measured pressure based on the pressure signal and the target pressure is outside the predetermined error range, the second processor 521 may output the control signal to the parking brake driver 523 to engage the parking brake of the rear wheels RL and RR.

When the difference between the measured pressure based on the pressure signal and the target pressure is outside the predetermined error range, the second processor 521 may output a control signal to the second motor driver 522 so that the second pressure source 200 provides the pressure of the pressure medium to the wheel brakes 21 and 22 of the front wheels FL and FR. When the second pressure source 200 is in the failed state, the second processor 521 may output the control signal to the parking brake driver 523 to engage the parking brake of the rear wheels RL and RR. In addition, when the difference between a measured pressure of the flow passages by the operation of the second pressure source 200 and a target pressure is outside a predetermined error range, the second processor 521 may output the control signal to the parking brake driver 523 to engage the parking brake of the rear wheels RL and RR.

When the difference between the measured pressure based on the pressure signal and the target pressure is outside the predetermined error range, the second processor 521 may output the control signal to the parking brake driver 523 to engage the parking brake of the rear wheels RL and RR along with outputting the control signal to the second motor driver 522 to provide the pressure of the pressure medium to the wheel brakes 21 and 22 of the front wheels FL and FR.

As described above, when the parking command signal is received while the vehicle is traveling, the brake apparatus 10 may attempt to brake the vehicle using the first pressure source 100. When braking using the first pressure source 100 is not valid, the brake apparatus 10 may attempt to brake the vehicle using the second pressure source 200 and/or the parking brake actuators 31 and 32.

Figure 4:
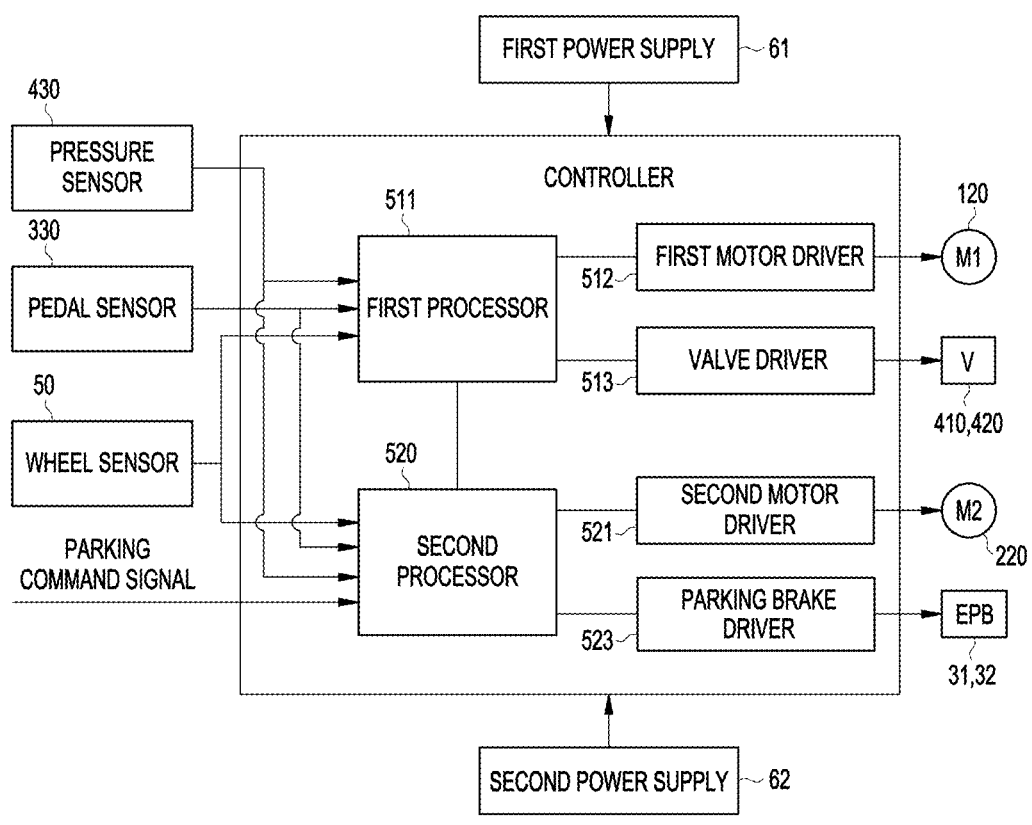
FIG. 4 illustrates another example of the controller included in the brake apparatus illustrated in FIG. 2.

FIG. 4 illustrates another example of the controller included in the brake apparatus illustrated in FIG. 2.

As illustrated in FIG. 4, the vehicle may be provided with a pressure sensor 430, a pedal sensor 330, a wheel sensor 50, a first motor 120, valves 410 and 420, a second motor 220, parking brake actuators 31 and 32, and/or a controller 500. The brake apparatus 10 in accordance with one embodiment may include the pressure sensor 430, the pedal sensor 330, the first motor 120, the valves 410 and 420, the second motor 220, and/or the controller 500, and the wheel sensor 50 and the parking brake actuators 31 and 32 may be provided separately from the brake apparatus 10 in accordance with one embodiment.

The pressure sensor 430, the pedal sensor 330, the wheel sensor 50, the first motor 120, the valves 410 and 420, the second motor 220, and the parking brake actuators 31 and 32 may be the same as the pressure sensor, the pedal sensor, the wheel sensor, the first motor, the valves, the second motor, and the parking brake actuators described with reference to FIG. 3.

The controller 500 may include a first controller 510 and a second controller 520. However, unlike the controller 500 illustrated in FIG. 3, the first controller 510 may be provided on a different printed circuit board within the same housing as the second controller 520, or may be provided on a different area on the same printed circuit board. The first controller 510, the first pressure source 100, the pressure control unit 400, the second controller 520, and the second pressure source 200 may be integrally provided in a single housing or provided as a single product.

In addition, the pressure sensor 430 may provide a pressure signal to both the first controller 510 and the second controller 520.

However, the first controller 510 may receive power from a different power source than the second controller 520. For example, the first controller 510, the first pressure source 100, and the pressure control unit 400 may receive power from a first power supply 61 of the vehicle, and the second controller 520 and the second pressure source 200 may receive power from a second power supply 62 of the vehicle.

The configuration and operation of the first controller 510 and the second controller 520 may be the same as the configuration and operation of the first and second controllers described with reference to FIG. 3.

For example, the first controller 510 may include the first motor driver 512, the valve driver 513, and the first processor 511, and the first processor 511 may output a control signal based on processing of the pedal signal and/or the wheel speed signal to the first motor driver 512 and/or the valve driver 513. The second controller 520 may include the second motor driver 522, the parking brake driver 523, and the second processor 521, and the second processor 521 may output a control signal based on processing of the pedal signal and/or the braking command signal to the second motor driver 522 and/or the parking brake driver 523.

In addition, the second processor 521 may request the first processor 511 to brake the vehicle using the first pressure source 100 based on the reception of the parking command signal while the vehicle is traveling. The second processor 521 may attempt to brake the vehicle using the second pressure source 200 and/or the parking brake actuators 31 and 32 based on a failure of the first pressure source 100.

Figure 5:
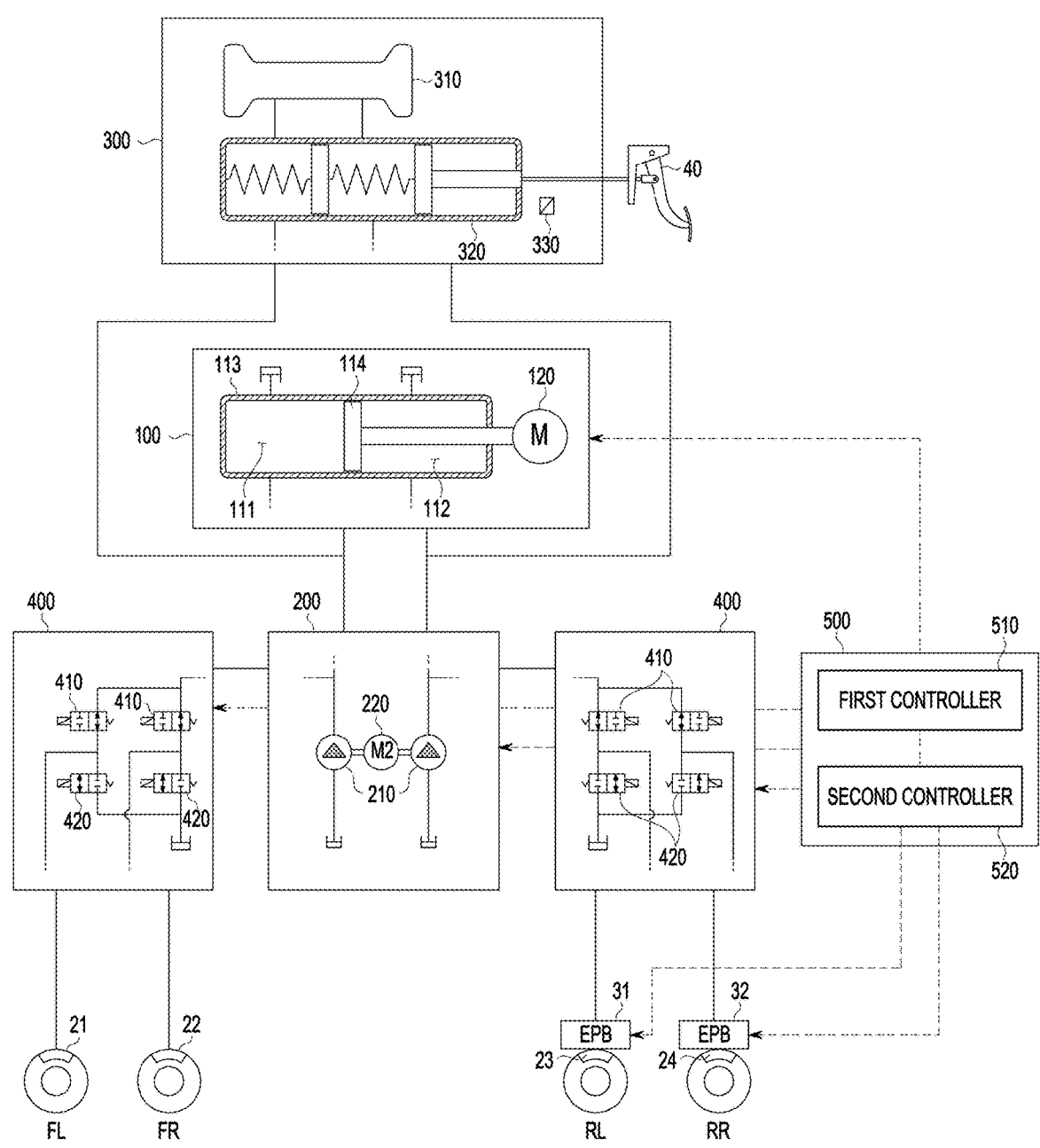
FIG. 5 illustrates one example of a brake apparatus in accordance with one embodiment.

FIG. 5 illustrates one example of a brake apparatus in accordance with one embodiment.

A vehicle may be provided with a wheel FL provided on the front left side of the vehicle, a wheel FR provided on the front right side of the vehicle, a wheel RL provided on the rear left side of the vehicle, and a wheel RR provided on the rear right side of the vehicle. A plurality of wheel brakes 21, 22, 23, and 24 may be provided in the plurality of wheels FL, FR, RL, and RR, respectively. As the pressure inside the wheel brakes 21, 22, 23, and 24 increases, a braking force may be applied to the wheels FL, FR, RL, and RR, and as the pressure inside the wheel brakes 21, 22, 23, and 24 decreases, the braking force on the wheels FL, FR, RL, and RR may decrease.

A first parking brake actuator 31 and a second parking brake actuator 32 may be provided on the wheel RL provided on the rear left side of the vehicle and the wheel RR provided on the rear right side of the vehicle, respectively. Depending on the operation of the parking brake actuators 31 and 32, the parking brake may be engaged with the rear wheels RL and RR or the parking brake may be released.

The brake apparatus 10 may control the pressure inside the wheel brakes 21, 22, 23, and 24 or control the operations of the parking brake actuators 31 and 32.

One example of the brake apparatus 10 may include the first pressure source 100, the second pressure source 200, the pressure control unit 400, the parking brake actuators 31 and 32, and the controller 500, as illustrated in FIG. 5. However, the first pressure source 100, the second pressure source 200, the auxiliary pressure source 300, the pressure control unit 400, the parking brake actuators 31 and 32, and the controller 500 do not correspond to necessary and sufficient components of the brake apparatus 10, and at least some of the components may be omitted or other components may be added.

The configuration and arrangement of the first pressure source 100, the auxiliary pressure source 300, and the parking brake actuators 31 and 32 may be the same as the first pressure source, the auxiliary pressure source, and the parking brake actuators illustrated in FIG. 2.

The configuration of the pressure control unit 400 and the second pressure source 200 is the same as the pressure control unit and the second pressure source illustrated in FIG. 2, but the arrangement of the pressure control unit 400 and the second pressure source 200 may be different from the pressure control unit and the second pressure source illustrated in FIG. 2.

The second pressure source illustrated in FIG. 2 may be connected to the flow passage between the pressure control unit and the wheel brakes, and the pressure medium discharged from the second pressure source may be supplied to the wheel brakes without passing through the pressure control unit.

On the other hand, the second pressure source 200 illustrated in FIG. 5 may be connected to the flow passage between the pressure control unit 400 and the first pressure source 100, and the pressure medium discharged from the second pressure source 200 may pass through the pressure control unit 400 and be supplied to the wheel brakes 21, 22, 23, and 24. In particular, the second pressure source 200 and the pressure control unit 400 may be integrally manufactured.

The controller 500 may be separated or divided into a first controller 510 and a second controller 520. The first controller 510 and the second controller 520 may be physically separated.

The first controller 510 and the second controller 520 may separately control the first pressure source 100, the second pressure source 200, the pressure control unit 400, and/or the parking brake actuators 31 and 32. For example, the first controller 510 may control the first pressure source 100, and the second controller 520 may control the second pressure source 200, the pressure control unit 400, and the parking brake actuators 31 and 32. However, the objects controlled by the first controller 510 and the second controller 520 are not limited to the aforementioned description.

The first controller 510 and the second controller 520 may exchange data with each other.

The second pressure source 200 and the parking brake actuators 31 and 32 may operate preliminarily or dually for the first pressure source 100.

Figure 6:
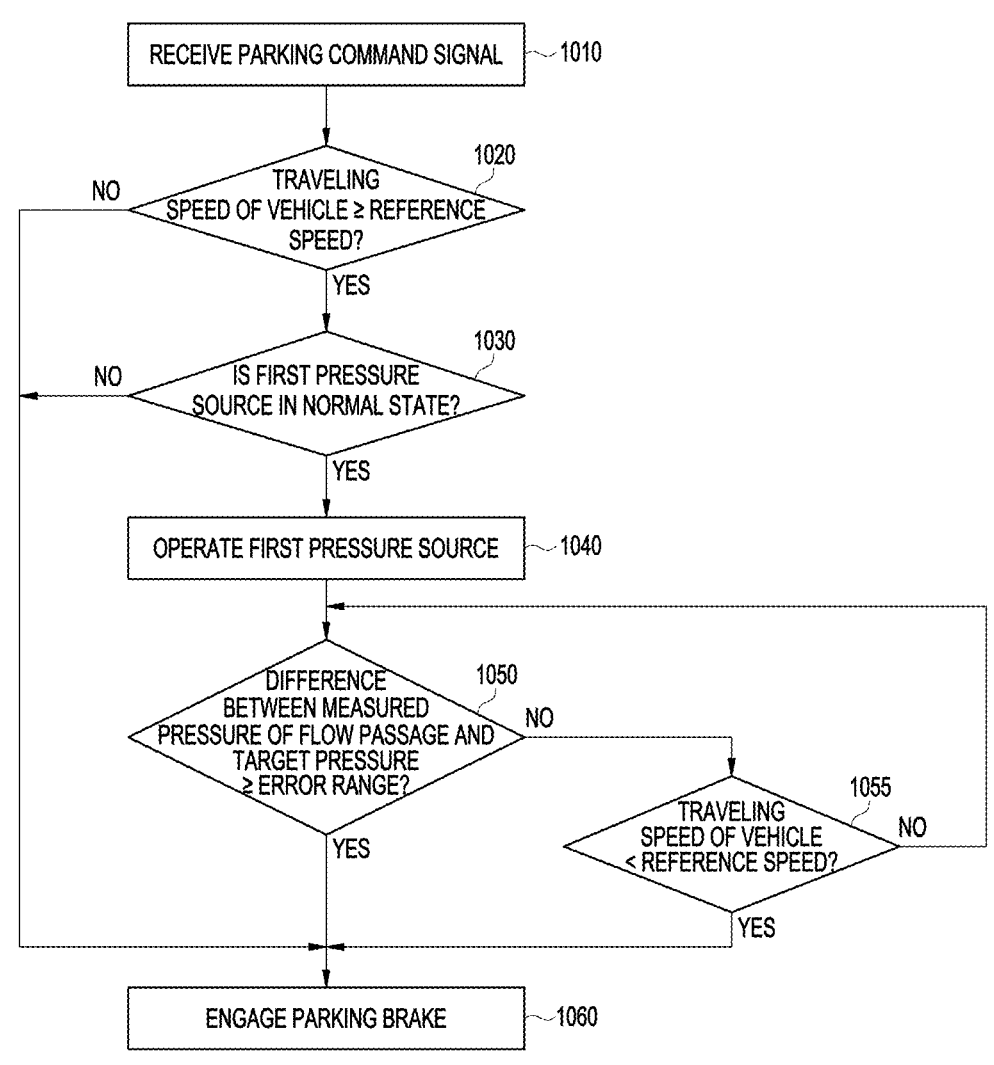
FIG. 6 illustrates one example of the operation of a brake apparatus in accordance with one embodiment.

FIG. 6 illustrates one example of the operation of a brake apparatus in accordance with one embodiment.

Operation 1000 of the brake apparatus 10 is described with reference to FIG. 6. Operations illustrated in FIG. 6 do not correspond to necessary and sufficient operations of the brake apparatus 10, and at least some of the operations may be omitted or other operations may be added.

As illustrated in FIGS. 2, 3, and 4, the brake apparatus 10 may include the first pressure source 100, the pressure control unit 400, the first controller 510, and the second pressure source 200, and the second controller 520. For example, the first controller 510 may control the first pressure source 100, and the second controller 520 may control the second pressure source 200 and/or the parking brake actuators 31 and 32 of the vehicle.

The brake apparatus 10 may receive a parking command signal (1010).

For example, the second controller 520 may receive a parking command signal. The parking command signal may be provided to the second processor 521 from various signal sources such as a parking switch, a transmission controller, and/or a vehicle central controller.

The brake apparatus 10 may identify whether a traveling speed of the vehicle is equal to or higher than a reference speed (1020).

For example, the second controller 520 receiving the parking command signal may determine the traveling speed of the vehicle based on a wheel speed signal of the wheel sensor 50. The second controller 520 may compare the traveling speed of the vehicle with the reference speed and identify whether the traveling speed of the vehicle is equal to or higher than the reference speed. The reference speed may be used as an identification reference to identify whether the vehicle is traveling or stopped, and may be set experimentally or empirically. The reference speed may be set, for example, between 7 KPH (km/hour) and 3 KPH, preferably to 5 KPH.

When the traveling speed of the vehicle is not equal to or higher than the reference speed (No in 1020), the brake apparatus 10 may engage the parking brake (1060).

For example, when the traveling speed of the vehicle is less than the reference speed, the vehicle may be stopped or at least expected to stop within a short period of time. The second controller 520, which receives the parking command signal while the traveling speed of the vehicle is less than the reference speed, may control the parking brake actuators 31 and 32 to engage the parking brake of the rear wheels RL and RR.

When the traveling speed of the vehicle is equal to or higher than the reference speed (Yes in 1020), the brake apparatus 10 may identify whether the first pressure source is in a normal state (1030).

For example, when the traveling speed of the vehicle is equal to or higher than the reference speed, the vehicle is traveling and may be expected to continue to travel. The second controller 520 may request braking using the first pressure source 100 from the first controller 510 to brake the vehicle. The first controller 510 may transmit a response signal based on an operating state of the first pressure source 100 to the second controller 520. The first controller 510 may transmit a response signal indicating the normal state of the first pressure source 100 to the second controller 520 based on the normal state of the first pressure source 100. The first controller 510 may transmit a response signal indicating a failed state of the first pressure source 100 to the second controller 520 based on the failed state of the first pressure source 100.

When the first pressure source 100 is not in the normal state (No in 1030), the brake apparatus 10 may engage the parking brake (1060).

When the first pressure source 100 is in the normal state (Yes in 1030), the brake apparatus 10 may operate the first pressure source 100 (1040).

For example, the first controller 510 may operate the first pressure source 100 in response to the first pressure source 100 being in the normal state. The first controller 510 may supply driving power to the first pressure source 100 to supply a predetermined target pressure or a target pressure determined depending on the traveling speed of the vehicle to the flow passages connected to the wheel brakes 21, 22, 23, and 24.

The brake apparatus 10 may identify whether the difference between the measured pressure of the flow passages and the target pressure is outside an error range (1050).

For example, the second controller 520 may monitor the operation of the first pressure source 100 based on reception of the response signal indicating the normal state of the first pressure source 100. The second controller 520 may obtain a pressure signal indicating the pressure of the flow passages connected to the wheel brakes 21, 22, 23, and 24 based on the reception of the response signal indicating the normal state of the first pressure source 100. The second controller 520 may obtain the pressure signal from the pressure sensor 430 or may obtain the pressure signal from the first controller 510. The second controller 520 may determine the measured pressure of the flow passages based on the pressure signal and identify whether the difference between the measured pressure of the flow passage and the target pressure is outside the error range.

When the difference between the measured pressure of the flow passages and the target pressure is not outside the error range (No in 1050), the brake apparatus 10 may identify whether the traveling speed of the vehicle is less than the reference speed (1055).

For example, when the difference between the measured pressure of the flow passages and the target pressure is within the error range, it may be determined that the first pressure source 100 is normally operating. The first controller 510 may compare the traveling speed of the vehicle with the reference speed and identify whether the traveling speed of the vehicle is less than the reference speed. The reference speed may be set, for example, between 7 KPH (km/hour) and 3 KPH, preferably to 5 KPH.

When the traveling speed of the vehicle is not less than the reference speed (No in 1055), the brake apparatus 10 may continue to operate the first pressure source 100.

For example, when the traveling speed of the vehicle is not less than the reference speed, it may be determined that the vehicle is not sufficiently braked.

When the traveling speed of the vehicle is less than the reference speed (Yes in 1055), the brake apparatus 10 may engage the parking brake (1060).

For example, when the traveling speed of the vehicle is less than the reference speed, the vehicle may be stopped or at least expected to stop within a short period of time. When the traveling speed of the vehicle is less than the reference speed while receiving the parking command signal, the second controller 520 may control the parking brake actuators 31 and 32 to engage the parking brake of the rear wheels RL and RR. In addition, the second controller 520 may request the first controller 510 to stop operating the first pressure source 100.

When the difference between the measured pressure of the flow passages and the target pressure is outside the error range (Yes in 1050), the brake apparatus 10 may engage the parking brake (1060).

For example, when the difference between the measured pressure of the flow passages and the target pressure is outside the error range, a failure of the first pressure source 100 may be identified. The second controller 520 may engage the parking brake to brake the vehicle based on identifying the failure of the first pressure source 100.

As described above, when the parking command signal is received while the vehicle is traveling (while a traveling speed is equal to or higher than the reference speed), the brake apparatus 10 may brake a vehicle using the first pressure source 100. However, when a failed state of the first pressure source 100 is detected or the difference between the measured pressure of the flow passages and the target pressure is outside an allowable error, the brake apparatus 10 may engage the parking brake.

Braking of the vehicle by the parking command signal while the vehicle is traveling may continue while reception of the parking command signal continues. For example, when the driver presses the parking switch while the vehicle is traveling, the brake apparatus 10 may brake the vehicle using the first pressure source 100 or the parking brake actuators 31 and 32. When the driver stops pressing the parking switch before the vehicle stops (or before the traveling speed of the vehicle becomes less than the reference speed), the brake apparatus 10 may stop braking the vehicle.

Figure 7:
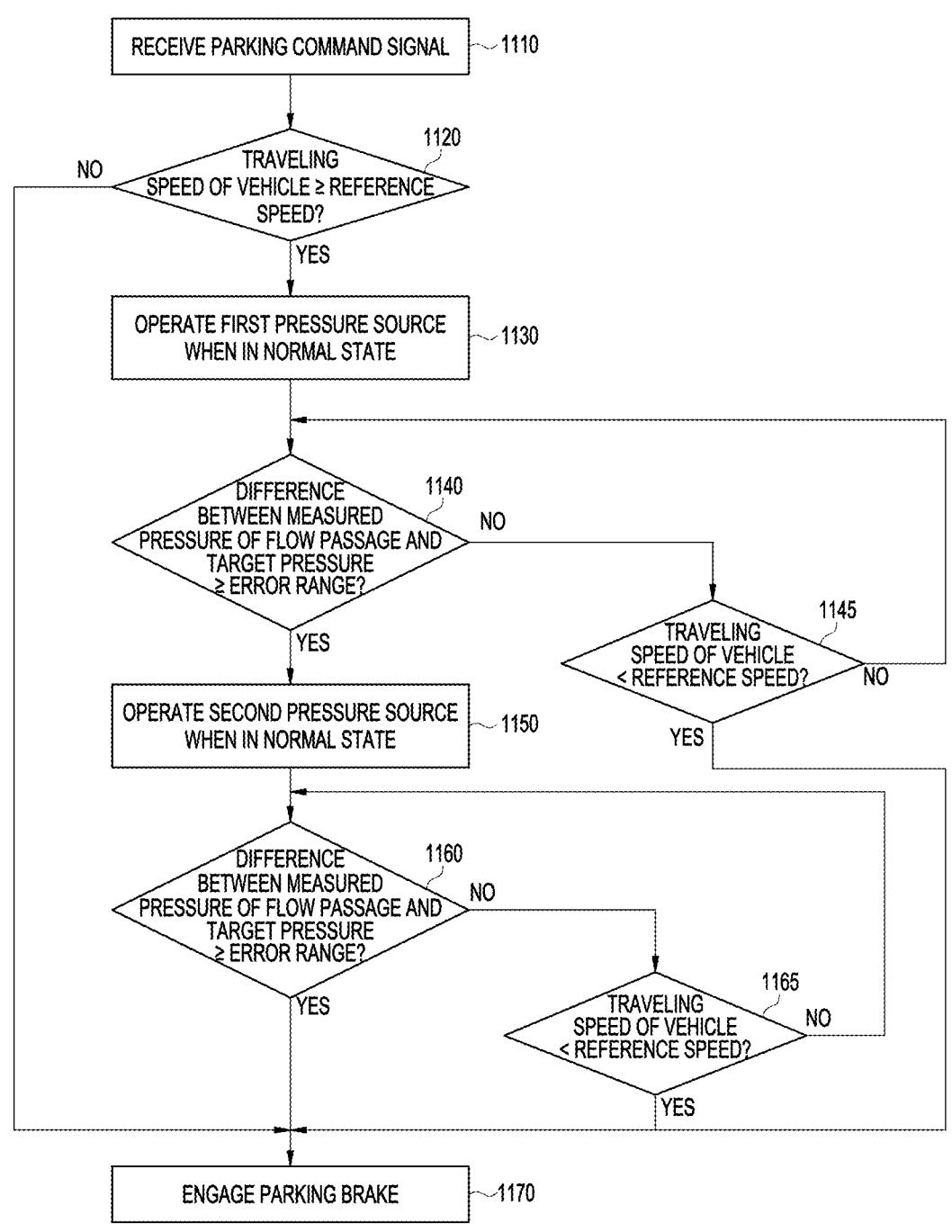
FIG. 7 illustrates one example of the operation of a brake apparatus in accordance with one embodiment.

FIG. 7 illustrates one example of the operation of a brake apparatus in accordance with one embodiment.

Operation 1100 of the brake apparatus 10 is described with reference to FIG. 7. Operations illustrated in FIG. 7 do not correspond to necessary and sufficient operations of the brake apparatus 10, and at least some of the operations may be omitted or other operations may be added.

As illustrated in FIGS. 2, 3, and 4, the brake apparatus 10 may include the first pressure source 100, the pressure control unit 400, the first controller 510, and the second pressure source 200, and the second controller 520. For example, the first controller 510 may control the first pressure source 100, and the second controller 520 may control the second pressure source 200 and/or the parking brake actuators 31 and 32 of the vehicle.

The brake apparatus 10 may receive a parking command signal (1110). The brake apparatus 10 may identify whether a traveling speed of the vehicle is equal to or higher than a reference speed (1120).

For example, operations 1110 and 1120 may be the same as operations 1010 and 1020 described with reference to FIG. 6, respectively.

The brake apparatus 10 may operate the first pressure source 100 when the first pressure source 100 is in a normal state (1130).

For example, the second controller 520 may request the first controller 510 to brake or stop the vehicle using the first pressure source 100. The first controller 510 may operate the first pressure source 100 when the first pressure source 100 is in the normal state.

The brake apparatus 10 may identify whether a difference between the measured pressure of the flow passages and a target pressure is outside an error range (1140).

For example, operation 1140 may be the same as operation 1050 described with reference to FIG. 6.

When the difference between the measured pressure of the flow passages and the target pressure is not outside the error range (No in 1140), the brake apparatus 10 may identify whether the traveling speed of the vehicle is less than a reference speed (1145).

Operation 1145 may be the same as operation 1055 described with reference to FIG. 6.

When the traveling speed of the vehicle is not less than the reference speed (No in 1145), the brake apparatus 10 may continue to operate the first pressure source 100.

When the traveling speed of the vehicle is less than the reference speed (Yes in 1145), the brake apparatus 10 may engage the parking brake (1170).

Operation 1170 may be the same as operation 1060 described with reference to FIG. 6.

When the difference between the measured pressure of the flow passages and the target pressure is outside the error range (Yes in 1140), the brake apparatus 10 may operate the second pressure source 200 when the second pressure source 200 is in the normal state (1150).

For example, the second controller 520 may operate the second pressure source 200 in response to the second pressure source 200 being in the normal state. The second controller 520 may supply driving power to the second pressure source 200 to supply a predetermined target pressure or a target pressure determined depending on the traveling speed of the vehicle to the flow passages connected to the wheel brakes 21, 22, 23, and 24.

The brake apparatus 10 may identify whether the difference between the measured pressure of the flow passages and the target pressure is outside the error range (1160).

For example, operation 1160 may be the same as operation 1050 described with reference to FIG. 6.

When the difference between the measured pressure of the flow passages and the target pressure is not outside the error range (No in 1160), the brake apparatus 10 may identify whether the traveling speed of the vehicle is less than the reference speed (1165).

Operation 1165 may be the same as operation 1055 described with reference to FIG. 6.

When the traveling speed of the vehicle is not less than the reference speed (No in 1165), the brake apparatus 10 may continue to operate the second pressure source 200.

When the traveling speed of the vehicle is less than the reference speed (Yes in 1165), the brake apparatus 10 may engage the parking brake (1170).

Operation 1170 may be the same as operation 1060 described with reference to FIG. 6.

When the difference between the measured pressure of the flow passages and the target pressure is outside the error range (Yes in 1160), the brake apparatus 10 may engage the parking brake (1170).

For example, when the difference between the measured pressure of the flow passages and the target pressure is outside the error range, a failure of the second pressure source 200 may be identified. The second controller 520 may engage the parking brake to brake the vehicle based on identifying the failure of the second pressure source 200.

As described above, when the parking command signal is received while the vehicle is traveling (while a traveling speed is equal to or higher than the reference speed), the brake apparatus 10 may brake a vehicle using the first pressure source 100. When a failed state of the first pressure source 100 is detected or the difference between the measured pressure of the flow passages and the target pressure is outside the allowable error, the brake apparatus 10 may brake the vehicle using the second pressure source 200, and may engage the parking brake when the failed state of the first pressure source 100 is detected or the difference between the measured pressure of the flow passages and the target pressure is outside the allowable error.

In accordance with one aspect of the present disclosure, it is possible to provide a brake apparatus including an electro-hydraulic brake and an electro-mechanical brake, wherein the brake apparatus controls the electro-mechanical brake based on a parking command while a vehicle is stopped.

In accordance with one aspect of the present disclosure, it is possible to provide a brake apparatus including an electro-hydraulic brake and an electro-mechanical brake, wherein the brake apparatus controls the electro-hydraulic brake based on a parking command while a vehicle is traveling.

In accordance with one aspect of the present disclosure, it is possible to provide a brake apparatus including an electro-hydraulic brake and an electro-mechanical brake, wherein the brake apparatus controls the electro-mechanical brake based on a parking command and a failure of the electro-hydraulic brake while a vehicle is traveling.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A brake apparatus comprising:
a pressure source hydraulically connected to a wheel brake of a vehicle through a flow passage connected to the wheel brake;
a parking brake actuator mechanically connected to the wheel brake;
a first processor configured to control the pressure source; and
a second processor configured to control the parking brake actuator in response to a parking command signal,
wherein the second processor is configured to transmit a request signal for braking the vehicle in response to the parking command signal received while the vehicle is traveling,
wherein the first processor is configured to control the pressure source to increase a pressure of the wheel brake in response to the request signal from the second processor configured to control the parking brake actuator, and
wherein the second processor is configured to control the parking brake actuator to engage a parking brake based on a pressure of the flow passage connected to the wheel brake while the pressure source hydraulically connected to the wheel brake is operating.

2. The brake apparatus of claim 1, wherein the second processor is configured to, in response to the parking command signal received while a traveling speed of the vehicle is equal to or higher than a predetermined reference speed, transmit the request signal for braking the vehicle to the first processor.

3. The brake apparatus of claim 1, wherein the second processor is configured to control the parking brake actuator to engage the parking brake when a difference between the pressure of the flow passage and a set target pressure is out of an allowable error.

4. The brake apparatus of claim 1, wherein:
the first processor is configured to:
identify whether the pressure source is in a normal state based on the request signal received from the second processor, and
transmit a first response signal to the second processor in response to identification of the normal state of the pressure source, and
the second processor is configured to determine the pressure of the flow passage connected to the wheel brake in response to the first response signal transmitted from the first processor.

5. The brake apparatus of claim 1, wherein:
the first processor is configured to:
identify whether the pressure source is in an abnormal state based on the request signal received from the second processor, and
transmit a second response signal to the second processor in response to identification of the abnormal state of the pressure source, and
the second processor is configured to control the parking brake actuator to engage the parking brake in response to the second response signal transmitted from the first processor.

6. The brake apparatus of claim 1, wherein the first processor is configured to:
 control the pressure source to increase the pressure of the wheel brake in response to the parking command signal received while the vehicle is traveling, and
 control the pressure source to decrease the pressure of the wheel brake in response to not receiving the parking command signal.

7. The brake apparatus of claim 1, wherein the second processor is configured to:
 control the parking brake actuator to engage the parking brake in response to the parking command signal received while the vehicle is traveling, and
 control the parking brake actuator to release the parking brake in response to not receiving the parking command signal.

8. The brake apparatus of claim 1, wherein the first processor and the second processor are disposed in different housings, respectively, and are connected to each other through a communication network.

9. The brake apparatus of claim 1, wherein the first processor provided on one printed circuit board and the second processor provided on another printed circuit board are disposed in a single housing.

10. The brake apparatus of claim 1, further comprising an other pressure source configured to be controlled by the second processor and hydraulically connected to the wheel brake through the flow passage,
 wherein the second processor is configured to:
 control the other pressure source to increase the pressure of the wheel brake based on the pressure of the flow passage connected to the wheel brake while the pressure source is operating, and
 control the parking brake actuator to engage the parking brake based on the pressure of the flow passage connected to the wheel brake while the other pressure source is operating.

11. A method of controlling a brake apparatus, the method comprising:
 controlling a pressure source, hydraulically connected to a wheel brake of a vehicle through a flow passage connected to the wheel brake, to increase a pressure of the wheel brake in response to a parking command signal received while the vehicle is traveling, wherein the parking comment signal is for engaging or releasing a parking brake; and
 engaging the parking brake based on a pressure of the flow passage connected to the wheel brake while the pressure source hydraulically connected to the wheel brake is operating.

12. The method of claim 11, wherein the controlling of the pressure source includes, in response to the parking command signal received while a traveling speed of the vehicle is equal to or higher than a predetermined reference speed, controlling the pressure source to increase the pressure of the wheel brake.

13. The method of claim 11, wherein the engaging of the parking brake includes engaging the parking brake when a difference between the pressure of the flow passage and a set target pressure is out of an allowable error.

14. The method of claim 11, further comprising:
 identifying whether the pressure source is in a normal state; and
 determining the pressure of the flow passage connected to the wheel brake in response to identification of the normal state of the pressure source.

15. The method of claim 11, further comprising:
 identifying whether the pressure source is in an abnormal state; and
 engaging the parking brake in response to identification of the abnormal state of the pressure source.

16. The method of claim 11, further comprising:
 controlling the pressure source to increase the pressure of the wheel brake in response to the parking command signal received while the vehicle is traveling; and
 controlling the pressure source to decrease the pressure of the wheel brake in response to not receiving the parking command signal.

17. The method of claim 11, further comprising:
 engaging the parking brake in response to the parking command signal received while the vehicle is traveling; and
 releasing the parking brake based in response to not receiving the parking command signal.

18. A brake apparatus comprising:
 a first pressure source hydraulically connected to a wheel brake of a vehicle through a flow passage connected to the wheel brake;
 a second pressure source hydraulically connected to the wheel brake through the flow passage;
 a parking brake actuator mechanically connected to the wheel brake;
 a first processor configured to control the first pressure source; and
 a second processor configured to control the second pressure source, and control the parking brake actuator in response to a parking command signal,
 wherein the second processor is configured to transmit a request signal for braking of the vehicle in response to the parking command signal received while the vehicle is traveling,
 wherein the first processor is configured to control the first pressure source to increase a pressure of the wheel brake in response to the request signal from the second processor configured to control the second pressure source and the parking brake actuator, and
 wherein the second processor is configured to control the second pressure source to increase the pressure of the wheel brake based on a pressure of the flow passage connected to the wheel brake while the first pressure source is operating, and control the parking brake actuator to engage a parking brake based on the pressure of the flow passage connected to the wheel brake while the second pressure source is operating.

19. The brake apparatus of claim 18, wherein the second processor is configured to, in response to the parking command signal received while a traveling speed of the vehicle is equal to or higher than a predetermined reference speed, transmit the request signal for braking the vehicle to the first processor.

20. The brake apparatus of claim 18, wherein the second processor is configured to:
 control the second pressure source to increase the pressure of the wheel brake when a difference between the pressure of the flow passage and a set target pressure is out of an allowable error while the first pressure source is operating; and
 control the parking brake actuator to engage the parking brake when the difference between the pressure of the flow passage and the set target pressure is out of the allowable error while the second pressure source is operating.

* * * * *